United States Patent

[11] 3,620,612

| [72] | Inventor | Mitchell C. Hopper<br>2003 Suzanne Terrace N.W., Huntsville, Ala. 35810 |
|---|---|---|
| [21] | Appl No | 820,936 |
| [22] | Filed | May 1, 1969 |
| [45] | Patented | Nov. 16, 1971 |

[54] MICROFICHE HANDLER
9 Claims, 16 Drawing Figs.

[52] U.S. Cl. ............................................. 353/27
[51] Int. Cl. ............................................. G03b 23/08
[50] Field of Search............................ 353/25, 26, 27, 95; 355/53; 108/61, 102, 137; 269/66 M. 350/172; 74/89 15

[56] References Cited
UNITED STATES PATENTS

| 1,383,340 | 5/1921 | Robbins | 33/141 |
| 1,846,972 | 2/1932 | Kappe | 355/53 |
| 2,260,551 | 10/1941 | Boni | 353/27 |
| 2,821,105 | 1/1958 | Walker | 350/172 |
| 3,188,910 | 6/1965 | Brownescombe | 353/25 |
| 3,352,201 | 11/1967 | Brownescombe | 353/27 |
| 3,446,552 | 5/1969 | Gross | 353/27 |
| 3,509,651 | 5/1970 | Robbins | 353/27 |

FOREIGN PATENTS

| 749,503 | 5/1956 | Great Britain | 353/25 |

Primary Examiner—Leonard Forman
Assistant Examiner—A. J. Mirabito
Attorneys—Harry M. Saragovitz, Edward J. Kelly, Herbert Berl and Harold W. Hilton ABSTRACT: Mechanism for holding and positioning a microfiche film relative to a projection system including a lens and light source disposed for projecting the microfiche image on a screen. The holding and positioning mechanism includes a first support member disposed for support of a pair of transparent plates having the microfiche sheet positioned therebetween, and a second support member carried by the projection mechanism for support of said first support member. The first support member is slidably carried on the second support member for movement in a first direction and the second support member is slidably mounted in the frame of the projection mechanism for movement in a second direction which is normal to the direction of movement of the first support member. A control device includes an override mechanism which will provide a free-floating relation of the support members to the projection mechanism frame to provide for rough positioning of the microfiche sheet relative to the lens and a vernier control to provide for fine adjustment of the microfiche sheet relative to the lens for projecting predetermined frames of the microfiche sheet to the screen.

FIG. 1

Mitchell C. Hopper, INVENTOR

Mitchell C. Hopper,
INVENTOR

Mitchell C. Hopper,
INVENTOR 3,620,612

MICROFICHE HANDLER

DEDICATORY CLAUSE

The invention described herein may be manufactured, used, and licensed by or for the U.S. Government for governmental purposes without the payment to me of any royalty thereon.

BACKGROUND OF THE INVENTION

The present invention provides apparatus for projection of microfiche images on an opaque screen for viewing in an area where space is limited. A microfiche is a film transparency approximately 105 mm. high by 148 mm. wide (National Microfiche Association) which contains a format of 98 frames each 12.5 mm. high by 10 mm. wide. A maximum photographic reduction ratio of 24:1 is used with this format.

Presently, there are a number of microfiche viewers available which are capable of displaying two king pages on a translucent screen using the rear projection method. The screen and the entire projection path is contained in an inclosure which makes the viewer quite bulky and restricts its use only to areas which have ample space to accommodate the extra bulk.

The viewer of the present invention is compact enough for use in areas where space is limited, such as equipment shelters, service vans, battery control trailers as used in missile launching, tanks, aircraft, ships, submarines, and other tactical vehicles requiring the use of maintenance support publications. A complete library of technical manuals can be carried in the vehicle in microfiche form at a volume reduction of about 400:1 as compared to other standard publications.

Manually operated microfiche handlers come in to groups, local and remote. Handlers in the local control group (includes those handlers having no gears, knobs, etc.) positions the microfiche support member in the X- and Y-coordinates by direct means by the operator, requiring the operator to manually move the carriage to the desired grid coordinate. This system provides for simple construction and rapid movement of the carriage from one position to another. However, accurate positioning is very difficult, because if the guide tracks are loose enough to allow the film handler to be moved freely, excessive vertical clearance in the guide tracks has an adverse affect on uniform focus from one extreme to the other.

On the other hand to insure uniform focus, the tight vertical clearance in the guide tracks contributes so much friction that it is very difficult to make fine adjustments in image position. For example, with a normal magnification of 24x, to move the image on the screen three-fourths of an inch, the microfiche handler must be moved only one thirty-second of an inch.

Handlers in the remote control system are positioned by belt, cable, rack, gear, lead screw, or other mechanical means. The operator usually must turn one knob to position the film handler in the X-axis and another knob to position the handler in the Y-axis.

A high ratio between rotational movement of the control knob and linear movement of the carriage movement provides for ease of critical position adjustment; however, changing from one extreme position to the other (left to right or top to bottom) requires many turns of the knob and consumes considerable time.

SUMMARY OF THE INVENTION

The device of the present invention includes mechanism for positioning an image on a microfiche sheet relative to the lens in a projection system. A control system includes an override mechanism to permit a rough positioning of the image adjacent the lens and a vernier control system for fine adjustment of the image relative to the lens.

The control system of the present invention combines the best features of both the above-discussed local and remote control systems. The override control disengages both X- and Y-vernier controls and allows the carriage to be positioned very rapidly to the approximate area of the desired position, whereupon the vernier control mechanism is reengaged to provide a high ratio between control knob rotation and carriage movement which allows very precise adjustment of the carriage position.

It is an object of the present invention, therefore, to provide a projector viewer with a film handler including a microfiche support member which is movable rapidly for roughly positioning the desired frame of a microfiche relative to the projection lens.

It is another object of the present invention to provide such a viewer projector with mechanism for vernier control and fine adjustment of the film handler responsive to the rough positioning thereof.

It is still a further object of the present invention to provide such a mechanism with means for retaining the handler in locked position during use.

It is yet another object of the present invention to provide such an aforementioned vernier control mechanism which permits precise control of small changes in image position.

These and other objects and attendant advantages of the present invention will be more readily apparent from the following description and drawings.

Figure 1:
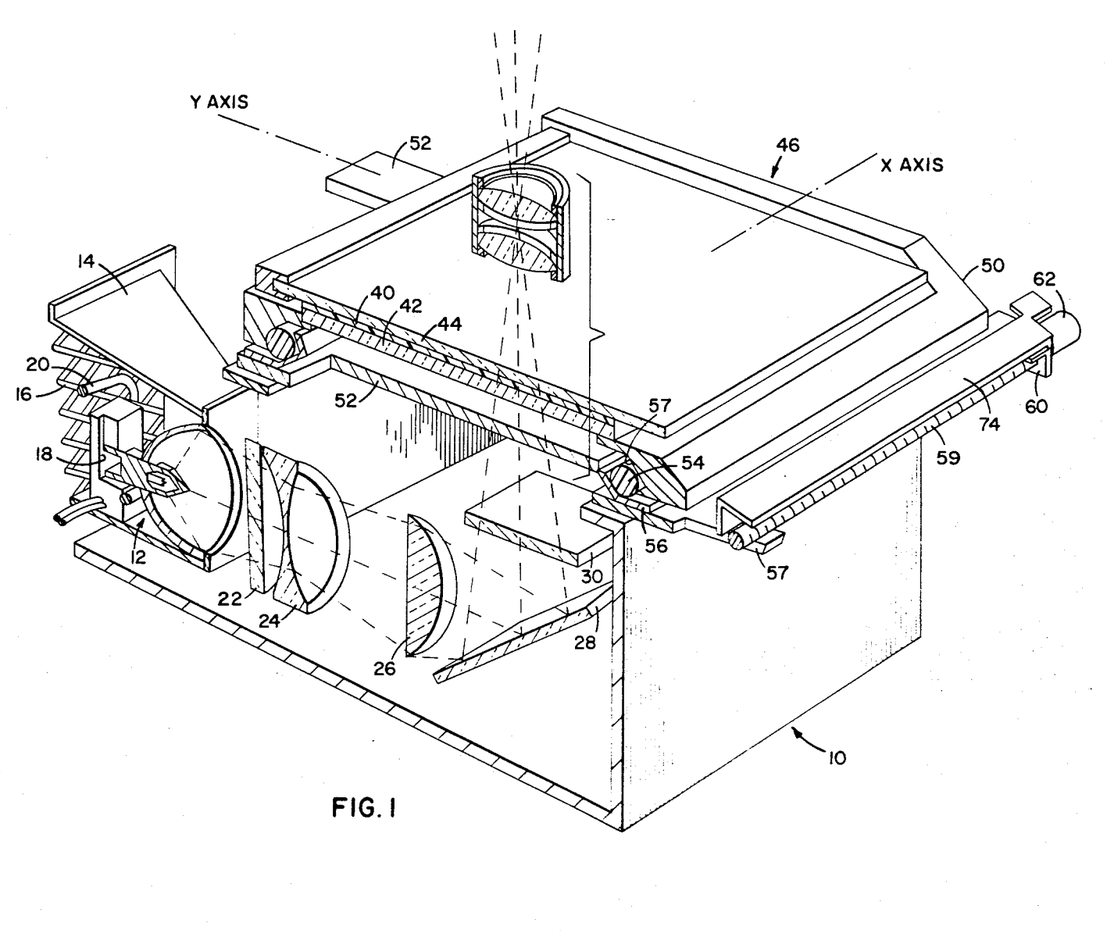
FIG. 1 is a pictorial view of a projector assembly and vernier control mechanism therefor.

As shown in FIG. 1 a projection device 10 is provided with a convection cooled light source 12. A reflective housing 14 mounted around the projection lamp directs the heat rearwardly through an exhaust grill 16. The projection lamp socket 18 is equipped with a quick remove lever 20 to simplify removal and replacement of the projection lamp.

A ground glass defuser 22 softens the light beam to remove harsh hot and cold spots from the light beam. A negative lens 24 diverges the prefocused beam to fill the secondary condensing lens 26. A right-angle mirror 28 redirects the converging light beam vertically through the heat-absorbing lens 30. The beam passes through a microfiche card 40 which is mounted between a pair of glass plates 42 and 44, and covers two adjacent frames on the microfiche and continues to the projection lens where it converges. The image is then projected to a mirror from which it is reflected to the screen.

Projection unit 10 further includes a microfiche handler 48 which is provided with an X-carriage 50 and a Y-carriage 52. The Y-carriage is mounted for in and out movement. Movement in the Y-axis allows selection of any line from the title line at the top of the microfiche to the bottom line on the card.

Figure 2:
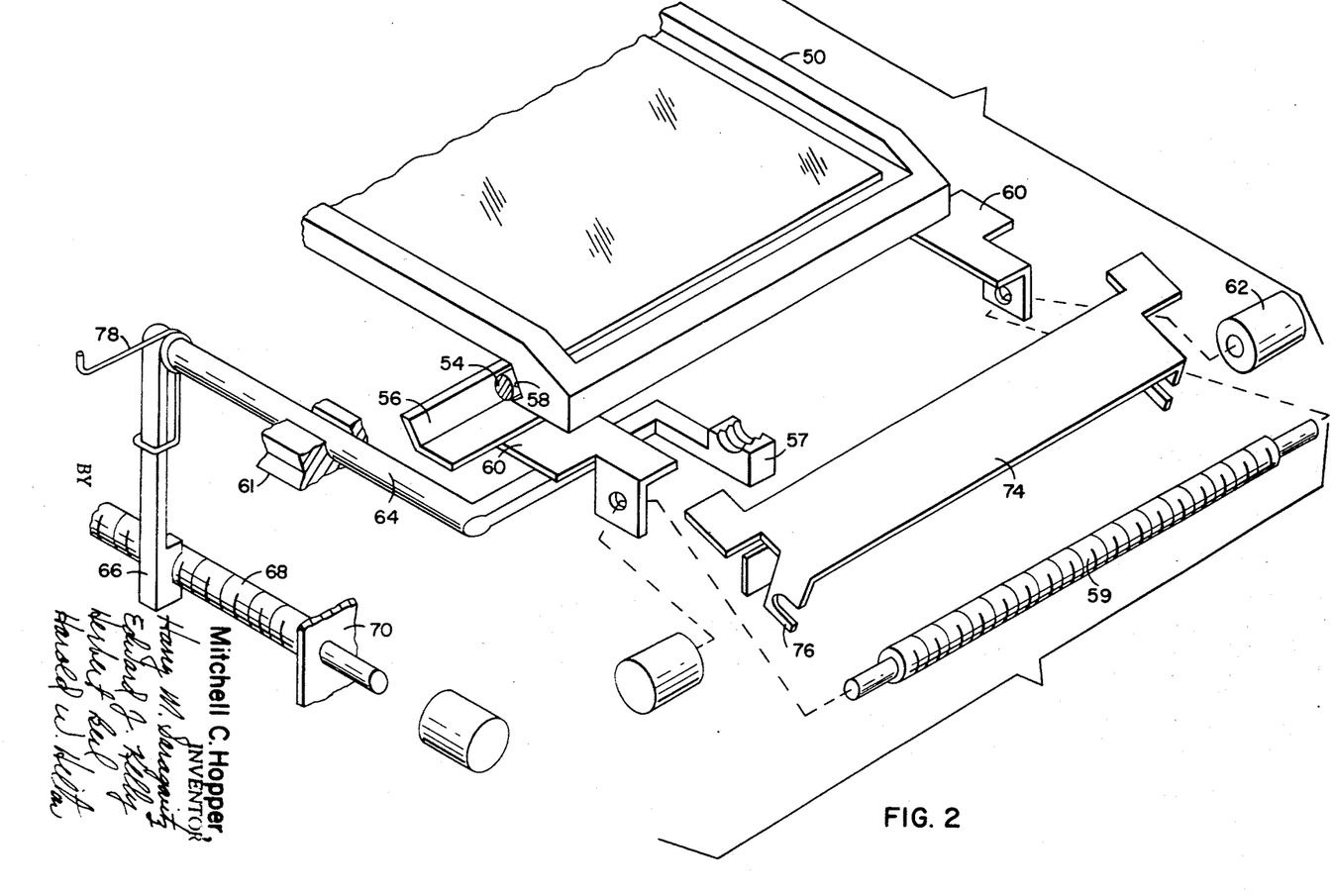
FIG. 2 is an exploded pictorial view of the control mechanism of the device of FIG. 1.

As shown in FIGS. 1 and 2, X-carriage 50 is supported by Teflon rods 54 carried in adjustable guide tracks 56 carried on the Y-carriage and also positioned in fixed guide tracks 58 formed on the X-carriage. A threaded follower 57 is secured to the Y-carriage and extends therefrom to support a threaded shaft 59 therein. Threaded shaft 59 is secured to the X-carriage by brackets 60. A vernier control knob 62 is secured to one end of shaft 60 and is disposed for rotation by the operator for movement of the X-carriage in a right or left direction, that is, in a direction normal to the direction of movement of the Y-carriage.

To provide in and out movement of the Y-carriage, a mechanism 61 (FIG. 2) is provided which is similar to that discussed in conjunction with movement of the X-table. Such mechanism includes an arm 64 rigidly secured to and extending from the follower 57. The arm is threaded at its other end 66 for threaded engagement with a second threaded shaft 68 which is mounted on the frame 70 of projection mechanism 10 and extending in a direction normal to shaft 68. Teflon rods (not shown) are provided between the Y-carriage guide track 61 and the projection device frame for ease of movement of the Y-carriage as discussed supra, in conjunction with the X-axis.

Simultaneous vernier override in accomplished by depressing an override lever 74 secured around shaft 59 by means of a bracket 76, to disengage shaft 59 from follower 57 and permit manual movement of the X-carriage to the approximate area desired.

A return spring 78 is secured to arm 64 and frame 70 to provide a counterclockwise returning force against arm 64 to return followers 57 and 66 to engagement with shafts 59 and 68, respectively. The image may than be adjusted to its exact desired position by rotating shafts 59 and 68 in their followers.

Figure 3:
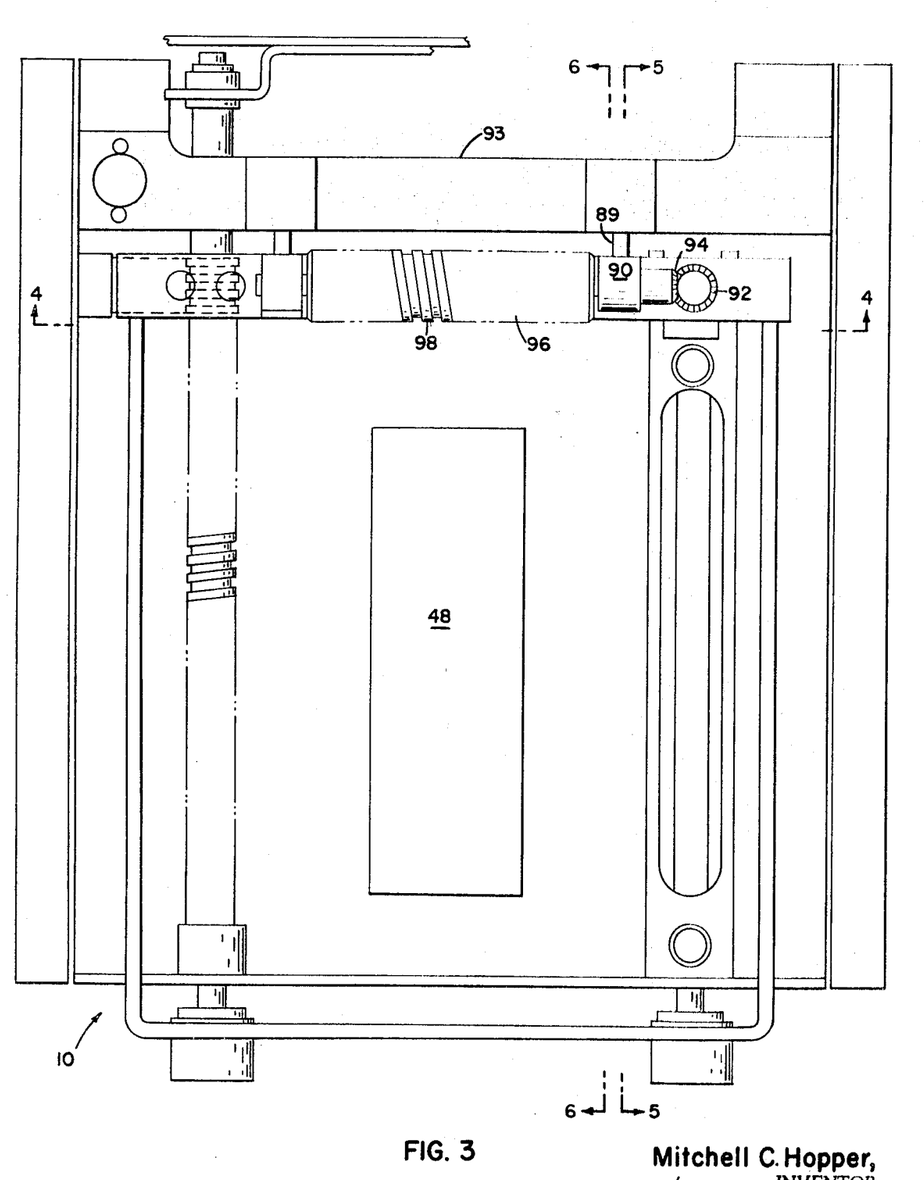
FIG. 3 is a plan view of another embodiment of my invention.

Another embodiment of the present invention is illustrated in FIGS. 3–9 wherein like reference numerals refer to like parts. As shown in FIG. 3, projection device 10 includes the microfiche handler 48 having control means for vernier and override control of the mechanism. As discussed above, the microfiche card 17 is carried between a pair of support plates 42 and 44 (FIG. 5) and is disposed for movement in the X- and Y-directions, first in a rapid manner to position a particular frame or frames of the microfiche in the approximate desired position and then for vernier adjustment in either direction for fine positioning of the microfiche card frame.

An X-carriage 50 is slidably mounted on a Y-carriage 52 for movement in an X-direction. The Y-carriage is slidably mounted on a stationary frame 70 for movement in a direction normal to the direction of travel of X-carriage 50. As can be seen from FIG. 5, X-frame 50 is slidably mounted on a pair of Teflon rods 54 for movement therealong. Rods 54 are positioned between a fixed guide track 56 carried on the X-frame and an adjustable guide track 58 secured to the Y-frame.

Figure 9:
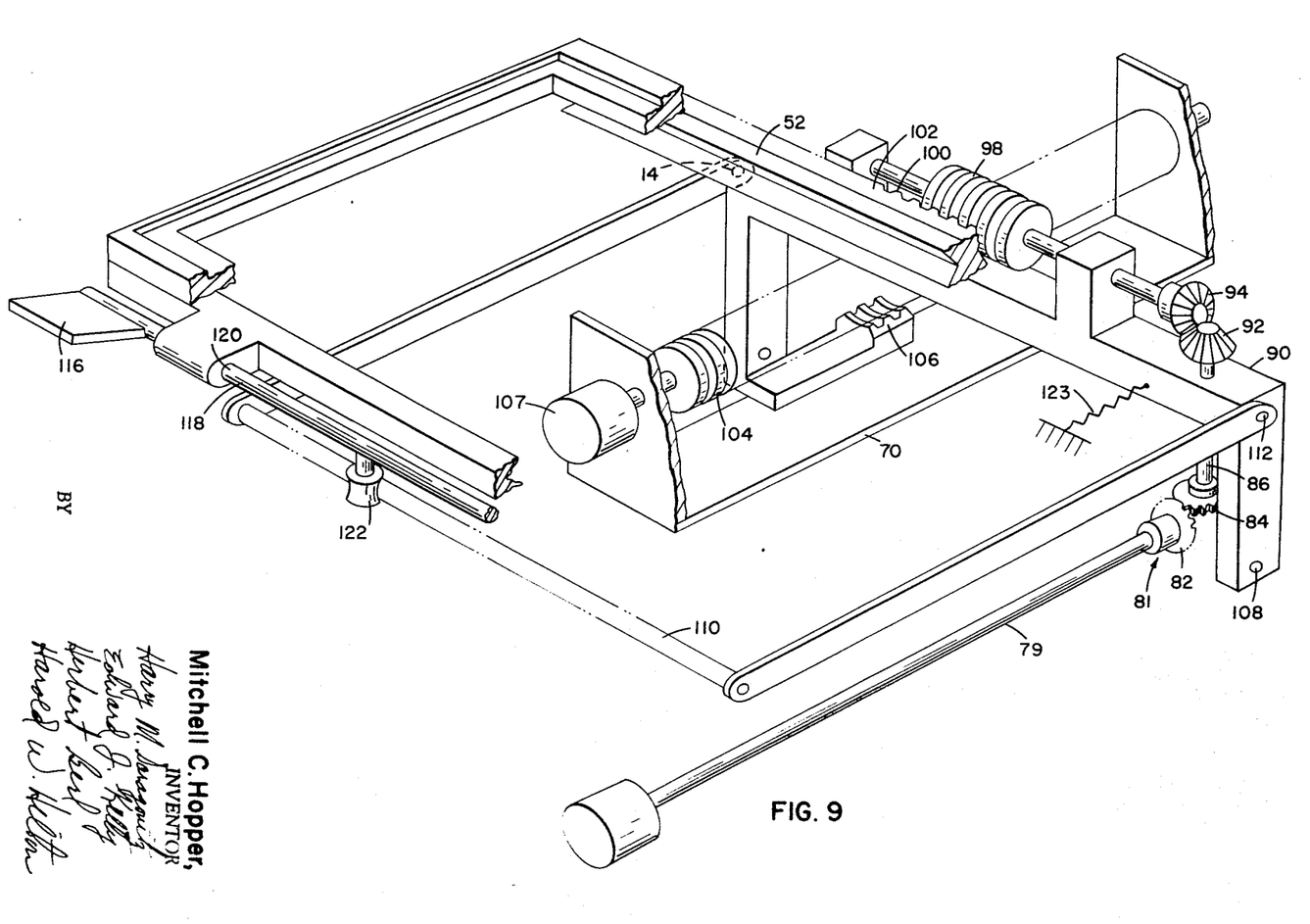
FIG. 9 is a pictorial view of the linkage mechanism of FIG. 8.
Figure 10:
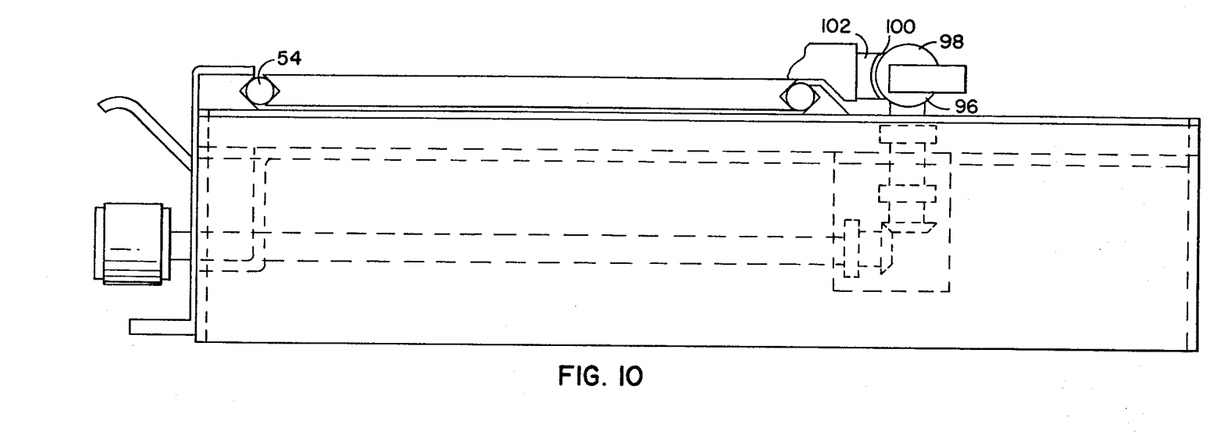
FIG. 10 is an elevational view of another embodiment of my invention.

To provide for movement of the X-frame in the X-direction, a shaft 79 is rotatably mounted in bearings 80 secured in housing 70. A first bevel gear 82 is secured to end 81 of shaft 79 and is disposed for meshed engagement with a second bevel gear 84 carried on one end of a shaft 86 secured in bearings 88 carried in a movable housing 90. Shaft 86 is disposed in substantially normal relation with shaft 79. A third bevel gear 92 is secured to the second end of shaft 86 for meshing engagement with a fourth bevel gear 94 (FIGS. 3 and 9) secured to a shaft 96 extending in a direction substantially normal to the direction of shaft 86. Shaft 96 is rotatably mounted in movable housing 90 and is provided with a worm gear 98 thereon, for meshing engagement with the teeth 100 of a rack 102 carried on X-frame 50 (FIG. 9).

Mechanism for moving Y-carriage 52 is a direction normal to the direction of travel of the X-carriage includes a worm gear 104 disposed for meshing with a partial rack 106 secured to housing 90 (FIG. 4) in a direction normal to the worm gear 98. Partial rack 106 is secured to housing 90 for movement of the Y-carriage responsive to rotation of a knob 107 secured to one end of the worm gear shaft.

Figure 4:
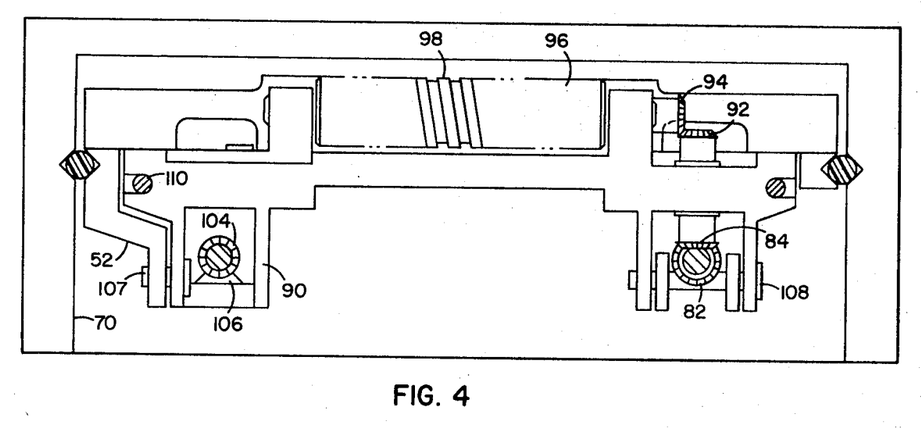
FIG. 4 is an elevational sectional view taken along line 4—4 of FIG. 3.
Figure 5:
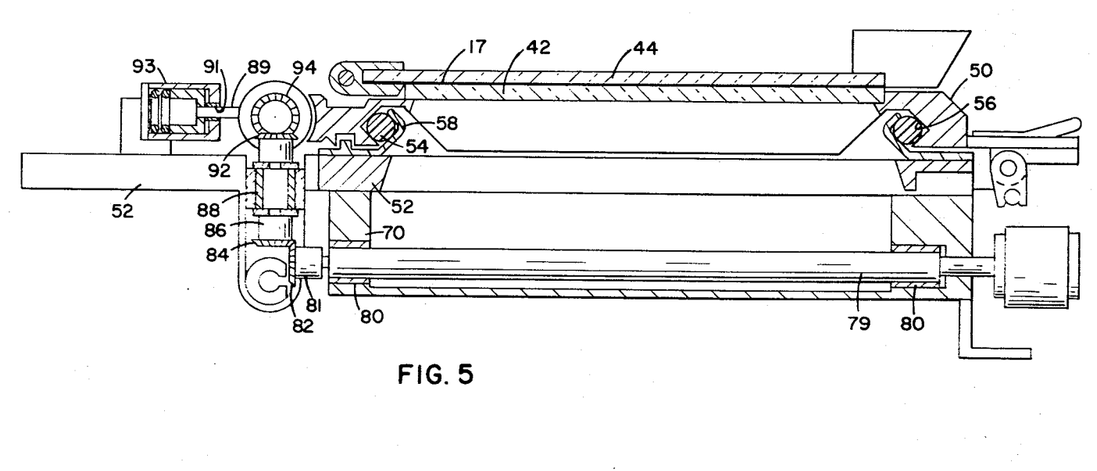
FIG. 5 is an elevational sectional view taken along line 5—5 of FIG. 3.
Figure 6:
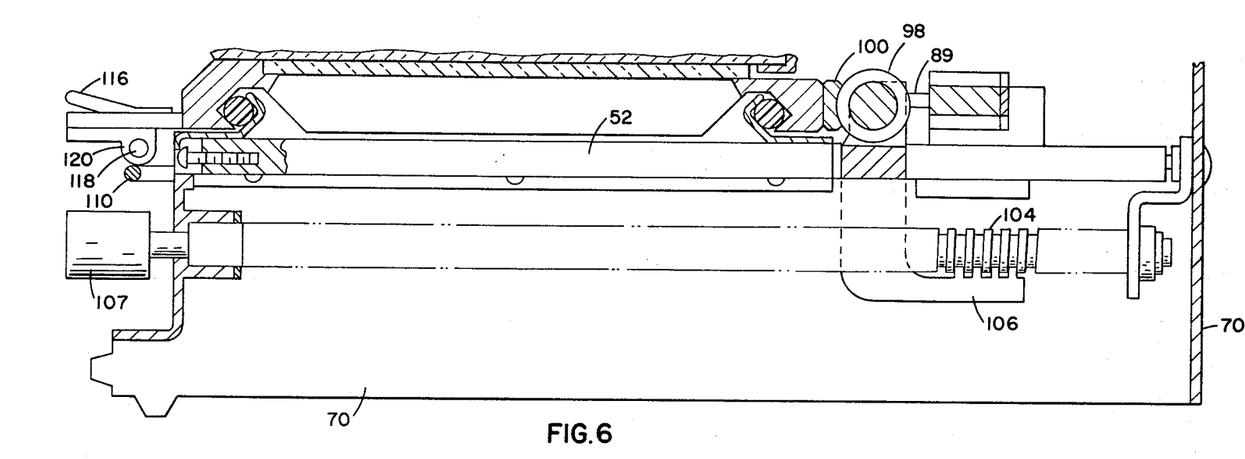
FIG. 6 is an elevational sectional view taken along line 6—6 of FIG. 3.
Figure 7:
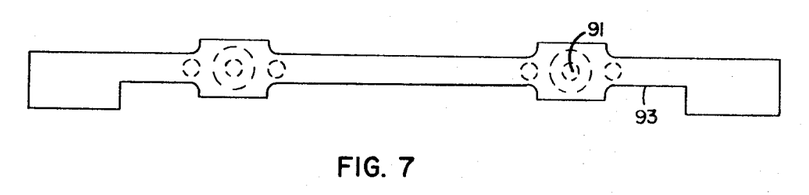
FIG. 7 is an elevational view of the detent bar as used in the embodiment of FIG. 3.
Figure 8:
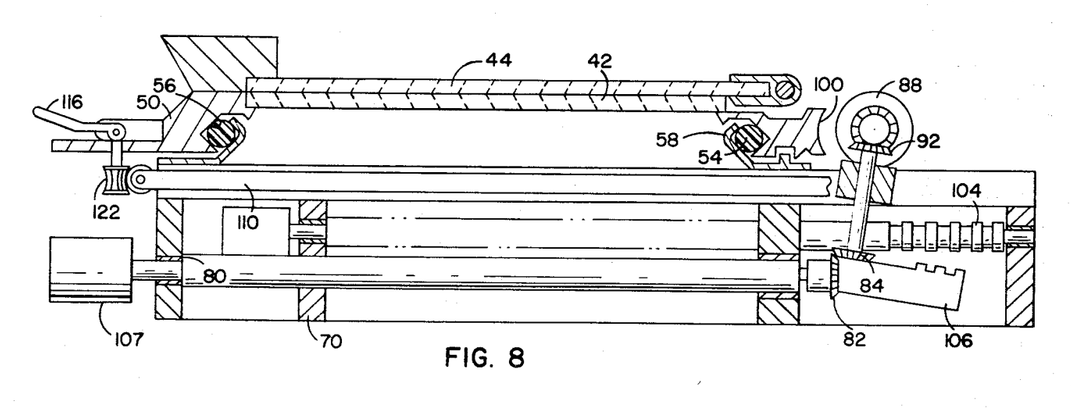
FIG. 8 is an elevational sectional view, cut away to illustrate the override mechanism for disengaging the carriage for rapid movement thereof.

To provide a means for disengaging the X- and Y-carriages from rack teeth 100 and worm gear 104, movable housing is pivotally mounted at pivot points 107 and 108 to frame 70 (FIG. 4). A linkage 110 is pivotally secured to housing 90 at points 112 and 114 (FIG. 9) for moving the housing about pivot points 107 and 108 to disengage worm gears 98 and partial rack 106 from rack 100 and worm gear 104 so that the carriage may be freely moved to the approximate desired position by the operator. Housing 90 is moved against a pair of spring-loaded plungers 89 (FIG. 5) which are mounted in pair of openings 91 (FIGS. 5 and 7) carried in a detent member 93 which is supported on the Y-carriage 52. To move housing 90, a tab 116 is mounted on a rod 118 rotatably secured on the X-carriage as shown at 120. A roller 122 extends from rod 118 to engage linkage 110 for backward movement thereof in response to downward movement of tab 116 by the operator, to displace movable housing 90 to a position whereby worm gear 98 and partial rack 106 are disengaged from rack 102 and worm gear 104 respectively.

A spring 123 is secured between frame 70 and housing 90 for biasing the housing back to its engaged position in response to release of tab 116 by the operator.

Figure 16:
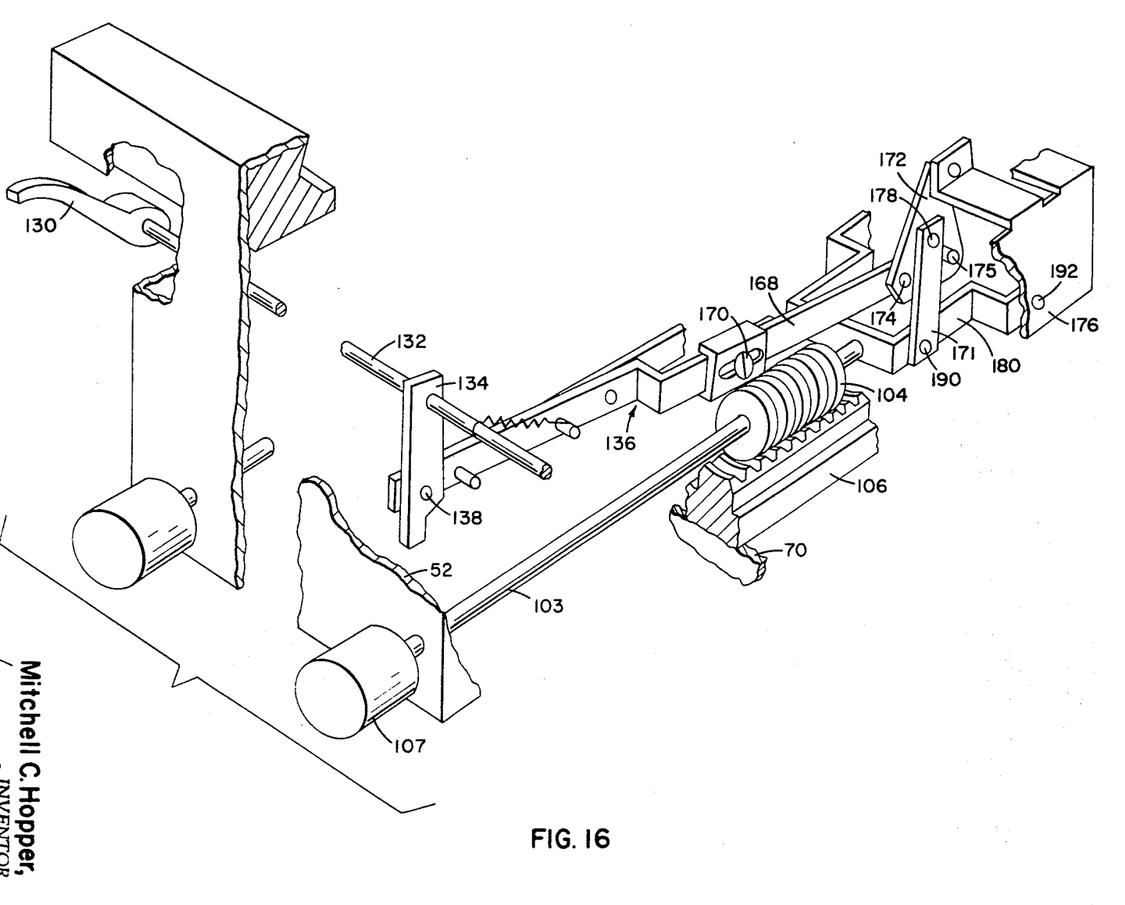
FIG. 16 is a dimensional view illustrating the Y-vernier control mechanism.

Still another embodiment of my invention is illustrated in FIGS. 10–16 wherein like reference numerals refer to like parts. In this embodiment the X- and Y-vernier control mechanism is modified from that previously disclosed. In this embodiment the X-carriage is mounted on a pair of Teflon rods 54 and a rack 102 provided with teeth 100 is disposed for meshed engagement with a worm gear 98 carried on shaft 96. A bevel gear 94 (FIG. 13) disposed on the end of shaft 96 is disposed for meshed engagement with a bevel gear 92 of shaft 86 having another bevel gear 84 secured to the opposite end thereof. A fourth bevel gear 82 secured to the end of shaft 78 is disposed for rotation responsive to rotation of shaft 79 for movement of the X-carriage. As shown in FIG. 16, worm gear 104 is disposed for meshed engagement with rack 106 and secured to the Y-carriage 52 for movement thereof responsive to rotation of knob 107, in similar manner discussed supra. Rack 106 is secured to frame 70.

Figure 11:
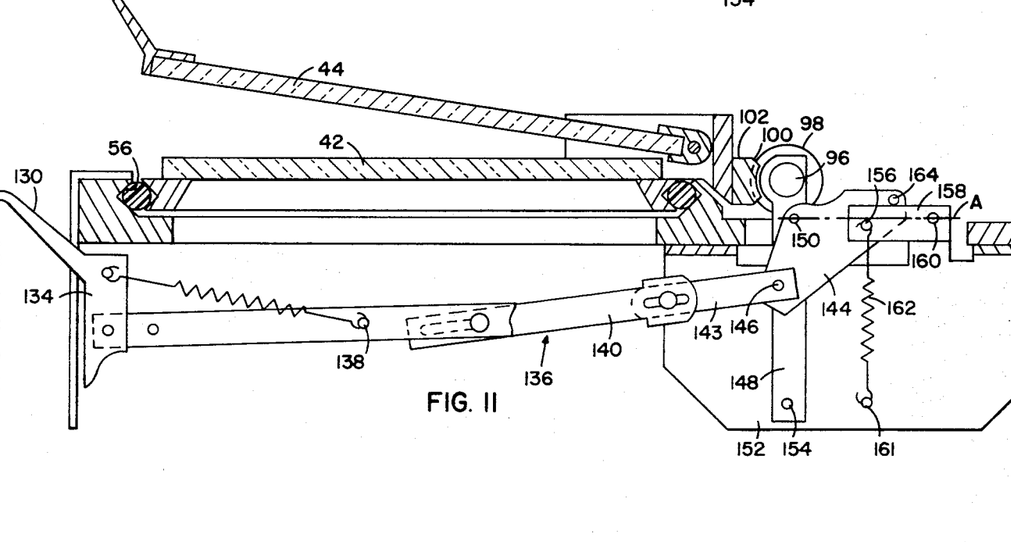
FIG. 11 is an elevational view of the override linkage of the X-vernier control of the device of FIG. 10, in engaged position.
Figure 12:
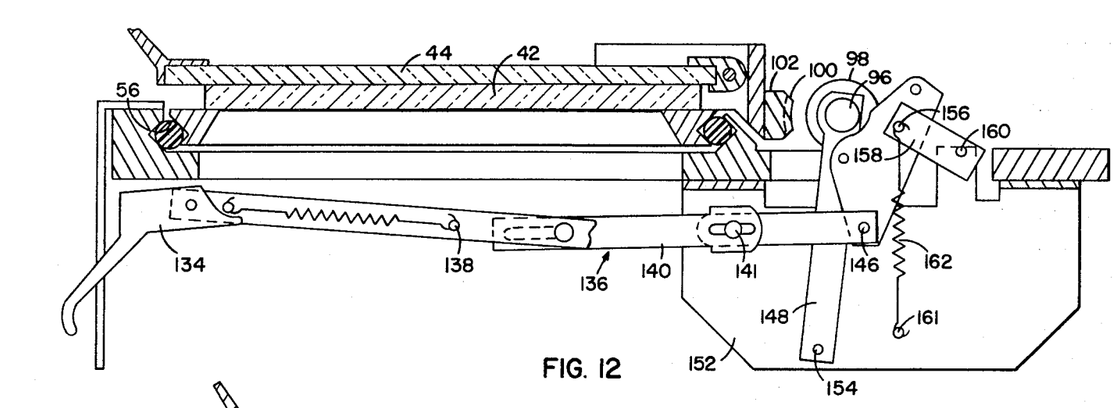
FIG. 12 is a view similar to FIG. 11 showing the linkage in disengaged position.
Figure 13:
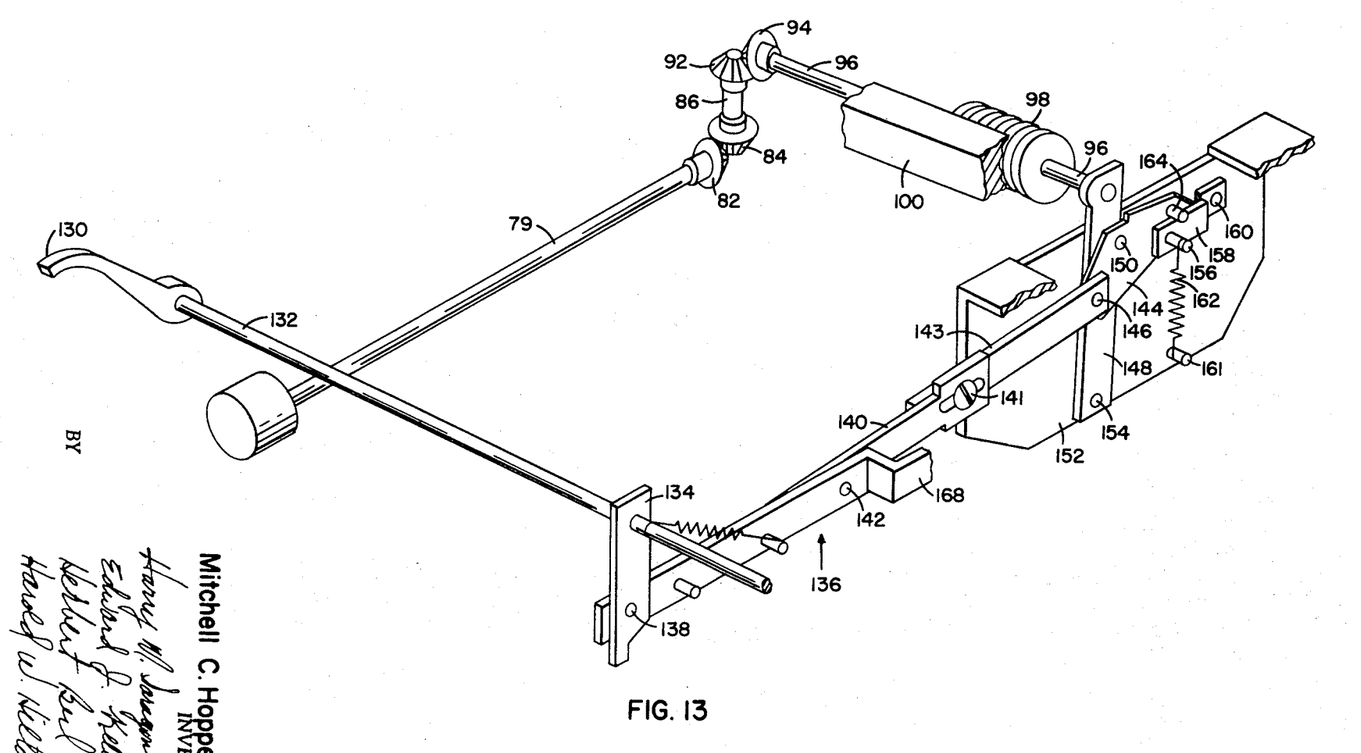
FIG. 13 is a dimensional view illustrating the linkage mechanism for the device of FIG. 10.

The override control for the X-carriage in this embodiment includes a tab 130 (FIG. 13) secured to a shaft 132 carried on the Y-carriage 52 and an arm 134 secured on shaft 132. Arm 134 extends downward from shaft 132 and is pivotally connected to an override linkage 136 by a pivot pin 138. Linkage 136 is connected to an x disengage extension member 140 by a pivot pin 142. Member 140 is adjustably connected at 141 to a second extension member 143 which is pivotally connected to a coupling 144 (FIG. 13) by a pin 146. Coupling 144 is pivotally secured to an override lever 148 by a pin 150. Lever 148 is pivotally secured to a frame 152 by a pin 154, and serves to pivotally support shaft 96 which supports worm gear 98. Member 144 includes a pin 156 extending through link 158 pivotally secured to frame 152 by a pivot pin 160. A spring 162 is secured to pin 156 of link 158 and to a pin 161 frame 152. A stop pin 164 extends from member 144 and rests with downward bias against surface of link 158 to hold the X-linkage in its engaged position whereby the worm gear 98 and rack 100 are in meshed relation. This meshed relation will be maintained as long as pin 156 remains below a horizontal line A drawn through pins 150 and 160 as shown in FIG. 11. However, downward movement of lever 130 causes link 158 to pivot upwardly, responsive to rotation of spring-biased member 144 to disengage worm gear 98 and rack 100.

The override control for the Y-carriage in this embodiment includes tab 130 (FIG. 16) secured to shaft 132 carried on the Y-carriage 52 and an arm 134 secured on shaft 132. Arm 134 extends downward from shaft 132 and is pivotally connected to an override linkage 136 by pivot pin 138. Linkage 136 is connected to a Y disengage extension member 168 through adjustable coupling shown at 170. Member 168 extends rearwardly and is secured to a Y disengage coupling 172 by pivot pin 174. Coupling 172 is pivotally secured to a frame 176 by a link 171 which is pivotally secured to coupling 172 by a pivot pin 178 and to a yoke 180 by a pin 190. Yoke 180 is pivotally secured to frame 176 by pin 192. Frame 176 is secured to the Y-carriage 52.

Figure 14:
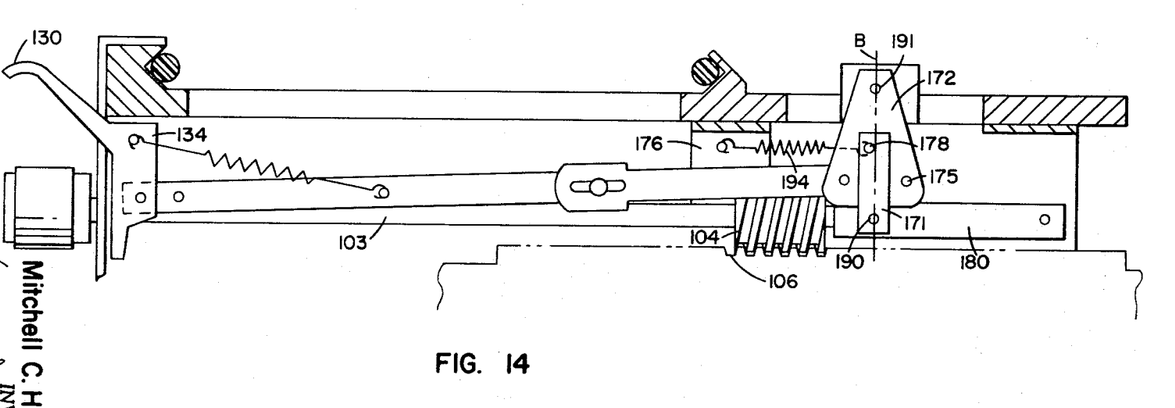
FIG. 14 is an elevational sectional view showing the Y-vernier control in engaged position.
Figure 15:
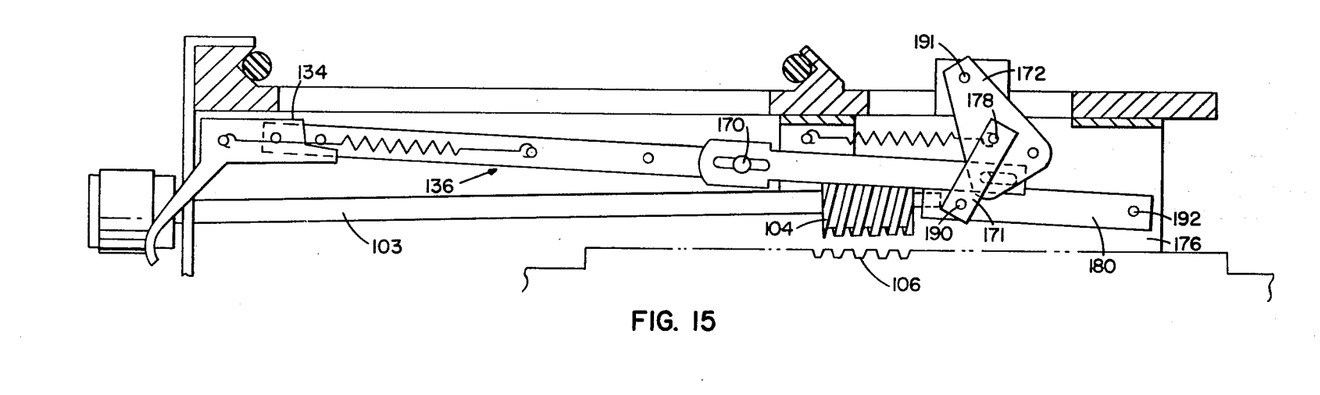
FIG. 15 is a view similar to FIG. 14 showing the Y-vernier control is disengaged position.

As shown in FIG. 14, worm gear 104 and rack 106 remain locked in a meshed condition when pin 178 is to the left of a vertical line-drawn B through pins 190 and 191.

The coupling member 172 is biased forwardly by a spring 194 connected between coupling member 172 and frame 176.

A stop pin 175 extends from coupling member 172 and rests with forward bias against link 171 to hold the Y-linkage in its engaged position whereby worm gear 104 and rack 106 are in meshed relation.

However, downward movement of lever 130 causes link 171 to pivot rearwardly and upwardly in response to rotation of coupling member 172 causing yoke 180 to raise disengaging worm gear 104 from rack 106 leaving Y-carriage free to be manually moved.

It is to be understood that the linkage simultaneously frees both the X- and Y-carriage so that manual movement in both coordinates may be readily accomplished. Release of the lever 130 reengages the worm and rack 98 and 100 and the worm and rack 104 and 106 so that vernier adjustment through knobs 107 and 60 may be accomplished.

I claim:

1. A projector viewer having mechanism for holding and positioning microfiche sheets relative to an optical system comprising:
    a. a first frame having a transparent microfiche sheet-supporting platen, said frame disposed for movement in a first direction;
    b. a second frame disposed for support of said first frame, said second frame disposed for movement in a second direction normal to the direction of movement of said first frame;
    c. a main frame having second frame slidably mounted thereon;
    d. first disengageable vernier drive means for moving said first frame in said first direction;
    e. second disengageable vernier drive means for moving said second frame in said second direction;
    f. control means for releasing said first and second drive means from said frame by means of a manually operated lever whereby said frames may also be manually moved, without resort to said first and second drive means, for positioning said microfiche in the approximate desired position relative to the optical system;
    g. said first and second vernier drive means disposed for vernier positioning of said microfiche sheet relative to the optical system responsive to movement of said platen to said approximate desired position.

2. Apparatus as in claim 1 wherein said first frame is mounted on said second frame, and guide means carried on said second frame for movement of said first frame therealong.

3. Apparatus as in claim 2 with said first vernier drive means including;
    a. a rack carried by said first frame along its coordinate or X-axis;
    b. a first threaded member rotatably mounted on said second frame;
    c. means for rotating said first threaded member along said rack for precisely positioning said first frame relative to said second frame.

4. Apparatus as in claim 3 with said second vernier drive means including;
    a. a second movable rack connected to said first threaded member and supported by said second frame;
    b. a second threaded shaft carried on said main frame in engaged relation with said second threaded member for movement of said second frame along a second coordinate or Y-axis.

5. Apparatus as in claim 4 wherein said control means includes linkage means operatively connected to said first threaded shaft and to said second movable rack for release thereof from said first rack and said first threaded shaft to provide for manual movement of said first and second frames relative to said main frame and the axis of said optical system.

6. Apparatus as in claim 5 including:
    a. a support member disposed for support of said first and second threaded shafts, said support member being pivotably secured in biased relation with said main frame; and,
    b. said linkage means being pivotably secured to said support member for displacement thereof.

7. Apparatus as in claim 6 wherein:
    a. said first threaded member is a worm gear carried on said support member for engagement with said first rack;
    b. said second threaded member being a worm gear carried on said main frame for engagement with said second rack; and,
    c. said vernier first drive means including a first shaft having a knob on one end thereof, a first bevel gear carried on the other end of said first shaft, a second shaft having a second bevel gear on one end thereof for meshing engagement with said first bevel gear and a third bevel gear on the other end of said second shaft, a fourth bevel gear secured to the end of said first threaded member for meshing relation with said third bevel gear, whereby rotation of said first shaft by said knob transmits rotating motion to said first threaded member for movement of said first rack therealong in the X-coordinate.

8. Apparatus as in claim 6 wherein said control means further includes:
    a. a first cam secured to said support member and having a cam surface disposed for engagement with said first threaded shaft for retention thereof against said first rack;
    b. a first arm pivotally secured to said first cam for pivotal movement thereof for release of said first threaded shaft from said rack to permit manual movement of said first frame in the X-direction.

9. Apparatus as in claim 8 with said control further including:
    a. a second cam secured to said main frame;
    b. a second arm having one end secured to said first arm and the other end pivotally secured to said second cam;
    c. a barlike member secured to said second arm and to said second threaded shaft, whereby movement of said second arm transmits rotary movement to said second cam for displacement of said barlike member and disengagement of said second threaded member from said second rack.

* * * * *